United States Patent
Suh et al.

(10) Patent No.: US 10,474,001 B2
(45) Date of Patent: Nov. 12, 2019

(54) WAVELENGTH SELECTION SWITCH INCLUDING A SWITCHING MODULE HAVING A LIQUID CRYSTAL PHASE ARRAY, A POLARIZER AND A LIQUID CRYSTAL ON SILICON

(71) Applicant: InLC Technology, Inc., Gwangju (KR)

(72) Inventors: Seong Woo Suh, Florham Park, NJ (US); Jiyoung Lee, Daejeon (KR); Namchol Song, Daejeon (KR); Seongmin Kang, Daejeon (KR)

(73) Assignee: INLC TECHNOLOGY, INC., Gwanju (KR)

( * ) Notice: Subject to any disclaimer, the term of this patent is extended or adjusted under 35 U.S.C. 154(b) by 141 days.

(21) Appl. No.: 15/519,752

(22) PCT Filed: Nov. 3, 2015

(86) PCT No.: PCT/IB2015/002457
§ 371 (c)(1),
(2) Date: Apr. 17, 2017

(87) PCT Pub. No.: WO2016/071777
PCT Pub. Date: May 12, 2016

(65) Prior Publication Data
US 2018/0299744 A1    Oct. 18, 2018

Related U.S. Application Data

(60) Provisional application No. 62/074,561, filed on Nov. 3, 2014.

(51) Int. Cl.
*G02F 1/31* (2006.01)
*H04B 10/548* (2013.01)
(Continued)

(52) U.S. Cl.
CPC ............ *G02F 1/31* (2013.01); *H04B 10/548* (2013.01); *H04J 14/0212* (2013.01);
(Continued)

(58) Field of Classification Search
CPC .. G02F 1/31; G02F 2203/50; G02F 1/136277; G02F 2203/05; G02F 1/0136;
(Continued)

(56) References Cited

U.S. PATENT DOCUMENTS 7,822,303 B2 * 10/2010 Cohen ................. G02B 6/2713
                                                385/11
2012/0236216 A1 * 9/2012 Sharma ................. G02B 26/02
                                                349/1
(Continued)

FOREIGN PATENT DOCUMENTS

JP          2013-101201 A       5/2013

OTHER PUBLICATIONS

International Search Report dated Jul. 15, 2016, issued to International Application No. PCT/IB2015/002457.

*Primary Examiner* — Huyen L Ngo
(74) *Attorney, Agent, or Firm* — Stein IP, LLC (57) ABSTRACT

A wavelength selective switch (WSS) apparatus. The WSS apparatus includes: a plurality of optical ports configured to emit input light beams to a switching module and receive output light beams from the switching module; and the switching module configured to receive the input light beams, select, according to a wavelength component of the input light beams, at least one of the plurality of optical ports to which the output light beams of the wavelength component are to propagate, and output the output light beams of the wavelength component to the selected at least one optical port, the switching module comprising: a polarization modulation element including an array of a plurality of
(Continued)

liquid crystal (LC) pixels; a polarizer; and a steering element including an array of a plurality of liquid crystal on silicon (LCOS) pixels.

14 Claims, 4 Drawing Sheets

(51) Int. Cl.
*H04J 14/02* (2006.01)
*H04Q 11/00* (2006.01)

(52) U.S. Cl.
CPC ..... *H04Q 11/0005* (2013.01); *G02F 2203/05* (2013.01); *H04Q 2011/0016* (2013.01)

(58) Field of Classification Search
CPC .......... G02F 2201/17; G02F 2203/055; H04Q 11/0005; H04Q 2011/0016; H04Q 2011/0026; H04B 10/548; H04J 14/0212; G02B 6/356; G02B 6/29311; G02B 27/4244; G02B 5/30; G02B 5/3083; G02B 6/293; G02B 6/2931; G02B 6/29313

See application file for complete search history.

(56) References Cited

U.S. PATENT DOCUMENTS

| | | | |
|---|---|---|---|
| 2013/0028556 A1* | 1/2013 | Cohen | G02B 6/351 385/17 |
| 2013/0194537 A1* | 8/2013 | Mao | G02F 1/133528 349/196 |
| 2014/0104560 A1* | 4/2014 | Suh | G02B 6/293 349/196 |
| 2014/0321796 A1* | 10/2014 | Ohtsuka | G02F 1/31 385/3 |
| 2014/0363162 A1* | 12/2014 | Chu | B82Y 20/00 398/49 |
| 2015/0208143 A1* | 7/2015 | Frisken | G02B 6/3512 398/48 |
| 2016/0234576 A1* | 8/2016 | Suh | H04Q 11/0005 |

* cited by examiner

LC: 1-dim polarization control

45°
rubbing direction

FIG. 2B

Polarizer

0°
polarization

FIG. 2C

LCoS: 2-dim phase array for beam steering

0°
rubbing direction

FIG. 3

WAVELENGTH SELECTION SWITCH INCLUDING A SWITCHING MODULE HAVING A LIQUID CRYSTAL PHASE ARRAY, A POLARIZER AND A LIQUID CRYSTAL ON SILICON

CROSS-REFERENCE TO RELATED APPLICATIONS

This is a national stage of International Application No. PCT/IB2015/002457, filed Nov. 3, 2015, which claims the benefit of priority of U.S. Provisional Application No. 62/074,561, filed Nov. 3, 2014 in the U.S. Patent and Trademark Office. The disclosures of the documents named above are incorporated herein hi their entireties by reference.

BACKGROUND OF THE INVENTION

1. Field of the Invention

The present subject matter relates generally to a wavelength selective switch (WSS) including a switching module having a multi-pixel liquid crystal (LC) phase array, a polarizer, and a two-dimensional liquid crystal device such as a liquid crystal on silicon (LCOS), polysilicon, or an amorphous silicon backplane, and more specifically, to a WSS including a switching module having a multi-pixel LC phase array, a polarizer, and an LCOS configured for use in an optical communication system.

2. Description of the Related Art

In optical communications systems, the use of wavelength selective switching for applications of optical cross-connects has attracted much interest because of the goal of fully flexible, networks where the paths of each wavelength can be reconfigured to allow arbitrary connection between nodes with the capacity appropriate for that link at a particular point in time.

It is known in the field of optical communications to use optical wavelengths as optical carriers for carrying digital or analog information. Also, the different wavelengths may be used to discriminate one set or channel of information from another. When a plurality of wavelengths are coupled or multiplexed onto a single fiber, this is called wavelength division multiplexing (WDM). Use of such WDM increases the overall bandwidth of the system. There is a need in such systems to switch packets of optical information passing along one fiber to any of a number of other fibers, according to the wavelength of the optical signal. Such a switch is known as an optical router or a wavelength selective switch. A number of wavelength dependent switches and routers exist in the prior art. For example, U.S. Pat. No. 7,092,599 to S. J. Frisken for "Wavelength Manipulation System and Method" describes a wavelength manipulation system using an LCOS phased array, with an optical arrangement including a spherical mirror and a cylindrical lens for maintaining collimation of the input beams in the direction of dispersion, and for focusing of the input beams in the direction perpendicular to the direction of dispersion. Also, in U.S. Pat. No. 7,822,303 to G. Cohen et al. for "Optical Wavelength Selective Router," there is described a fiber-optical, multiway, wavelength selective switch (WSS) structure, such as is used for channel routing and/or blocking applications in optical communication and information transmission systems.

U.S. patent application Ser. No. 14/055,171, filed by the applicant on Oct. 16, 2013, the disclosure of which in its entirety is incorporated herein by reference, is directed to a WSS including an LCOS for selectively diverting a certain wavelength component of light beams to continue to propagate and diverting another wavelength component of the light beams to other optical ports by controlling a voltage applied thereto and/or a polarization of the light beams. In accordance with such WSS structure, accurate control of the output angle of the beams can be realized. In addition, since it utilizes a polarization mode in the attenuation domain, any crosstalk between the domains, which happened when adopting conventional phase mode attenuation, can be prevented. However, it was discovered that in a WSS using an LCOS as a switching element, the attenuation control utilizing the LCOS phase array functionalities causes unexpected crosstalk between the ports, which allows the attenuated beams from a steering port to leak into the unintended neighboring ports.

SUMMARY OF THE INVENTION

An aspect of the present subject matter is directed to a wavelength selective switch (WSS) apparatus comprising: a plurality of optical ports configured to emit input light beams to a switching module and receive output light beams from the switching module; and the switching module configured to receive the input light beams, select, according to a wavelength component of the input light beams, at least one of the plurality of optical ports to which the output light beams of the wavelength component are to propagate, and output the output light beams of the wavelength component to the selected at least one optical port, the switching module comprising: a polarization modulation element that includes an array of a plurality of liquid crystal (LC) pixels; a polarizer that is configured to attenuate the input light beams output from the polarization modulation element and allow only a desired polarization of the input light beams to enter a steering element; and the steering element that includes an array of a plurality of liquid crystal on silicon (LCOS) pixels, wherein, in a horizontal direction, the plurality of LC pixels in the polarization modulation element are optically matched with the LCOS pixels in the steering element in such a way that the ratio of the former to the latter is a predetermined ratio throughout the entire pixels.

In the WSS apparatus according to an aspect of the present subject matter, the switching module selects the at least one of the plurality of optical ports by selectively diverting the input light beams of the wavelength component to continue to propagate while diverting the input light beams of another wavelength component to the other optical ports by controlling the voltage applied thereto and/or a polarization of light.

In the WSS apparatus according to an aspect of the present subject matter, the polarization modulation element, in combination with the polarizer, is configured to attenuate or block the input light beams, and the steering element in configured to steer the output light beams for port switching.

In the WSS apparatus according to an aspect of the present subject matter, the polarizer and the steering element have substantially the same polarization direction while the polarization modulation element has a 45 degree of polarization direction with respect to the polarization of the polarizer and steering element, thereby controlling amount of the light beams passing therethrough within the range of 0 to 100%.

In the WSS apparatus according to an aspect of the present subject matter, the polarization modulation element shares the same focal plane with the steering element.

In the WSS apparatus according to an aspect of the present subject matter, the polarization modulation element lies on a different focal plane from the steering element, and the former and the latter are optically combined using the telescopic optics.

In the WSS apparatus according to an aspect of the present subject matter, the polarization modulation element, the polarizer and the steering element are arranged in this order when seen from the plurality of optical ports so that the input light beams go through the polarization modulation element and the polarizer before being diverted at the steering element.

The WSS apparatus according to an aspect of the present subject matter, further comprising: a polarization dispersion element on a light path between the plurality of optical ports and a wavelength dispersion element, the polarization dispersion element being configured for making the input light beams output therefrom have substantially the same polarization; the wavelength dispersion element on a light path between the polarization dispersion element and a focusing element, the wavelength dispersion element being configured for dispersing wavelength components of the input light beams in the same plane as a plane in which the input light beams are generated; and the focusing element on a light path between the wavelength dispersion element and the switching module, the focusing element being configured for focusing the dispersed wavelength components of the input light beams onto the switching module, the LCOS phase array further comprises: a third liquid crystal (LC) domain provided between the first and second LC domains, the third LC domain including third liquid crystals that are oriented in a third direction, the third direction being different from the first and second directions, the reflection component is further configured to reflect a light beam input through the third LC domain back to the third LC domain.

The WSS apparatus according to an aspect of the present subject matter, further comprising: a relay element on a light path between the polarization dispersion element; and an anamorphic magnification element on a light path between the relay element and the wavelength dispersion element, the anamorphic magnification element being configured to have the input light beams anamorphically expanded.

In the WSS apparatus according to an aspect of the present subject matter, the wavelength dispersion element comprises a diffraction grating and a prism.

In the WSS apparatus according to an aspect of the present subject matter, the relay element comprises at least one of a spherical lens and a cylindrical lens.

In the WSS apparatus according to an aspect of the present subject matter, the anamorphic magnification element comprises at least one of a pair of prisms and a pair of cylindrical lenses.

In the WSS apparatus according to an aspect of the present subject matter, the plurality of optical ports consist of at least two input ports and one output port.

In the WSS apparatus according to an aspect of the present subject matter, the array of the plurality of LC pixels included in the polarization modulation element is a two-dimensional array of LC pixels.

Another aspect of the present subject matter is directed to an optical communication system having a wavelength selective switch (WSS) apparatus, the WSS apparatus comprising: a plurality of optical ports configured to emit input light beams to a switching module and receive output light beams from the switching module; and the switching module configured to receive the input light beams, select, according to a wavelength component of the input light beams, at least one of the plurality of optical ports to which the output light beams of the wavelength component are to propagate, and output the output light beams of the wavelength component to the selected at least one optical port, the switching module comprising: a polarization modulation element that includes a one-dimensional array of a plurality of liquid crystal (LC) pixels; a polarizer that is configured to attenuate the input light beams output from the polarization modulation element and allow only a desired polarization of the input light beams to enter a steering element; and the steering element that includes a two-dimensional array of a plurality of active matrix liquid crystal (AMLC) pixels, wherein, in a horizontal direction, the plurality of LC pixels in the polarization modulation element are optically matched with the AMLC pixels in the steering element in such a way that the ratio of the former to the latter is a predetermined ratio throughout the entire pixels, wherein the AMLC pixels include at least one selected from the group consisting of a silicon backplane, a polysilicon backplane and an amorphous silicon backplane.

In the optical communication system according to an aspect of the present subject matter, the switching module selects the at least one of the plurality of optical ports by selectively diverting the input light beams of the wavelength component to continue to propagate while diverting the input light beams of another wavelength component to the other optical ports by controlling the voltage applied thereto and/or a polarization of light.

In the optical communication system according to an aspect of the present subject matter, the polarization modulation element, in combination with the polarizer, is configured to attenuate or block the input light beams, and the steering element in configured to steer the output light beams for port switching.

In the optical communication system according to an aspect of the present subject matter, the polarizer and the steering element have substantially the same polarization direction while the polarization modulation element has a 45 degree of polarization direction with respect to the polarization of the polarizer and steering element, thereby controlling amount of the light beams passing therethrough within the range of 0 to 100%.

In the optical communication system according to an aspect of the present subject matter, the polarization modulation element shares the same focal plane with the steering element.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1A:
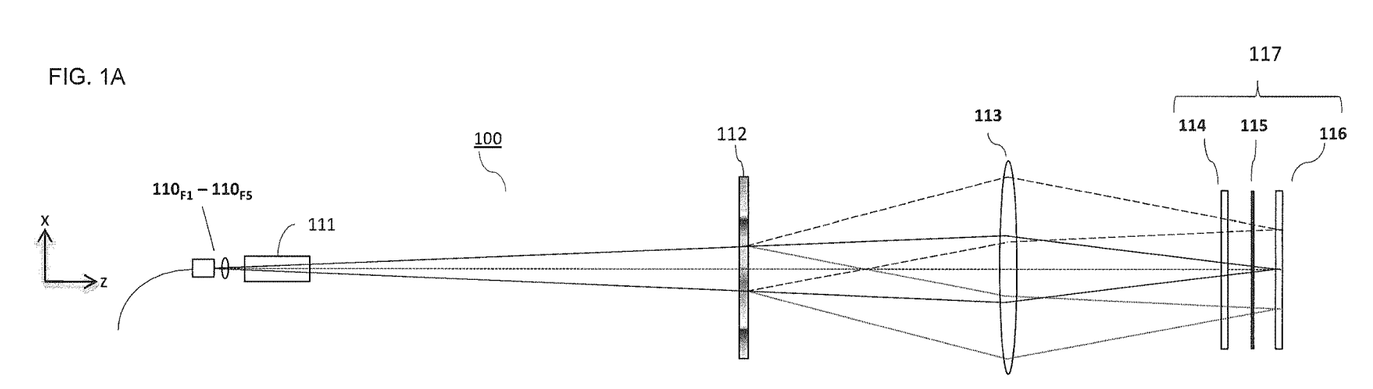
FIG. 1A is a schematic top plan view of a wavelength selective switch (WSS) structure using a switching module having a liquid crystal on silicon (LCOS) phase array and a multi-pixel liquid crystal (LC) unit according to a first embodiment of the present subject matter.
Figure 1B:
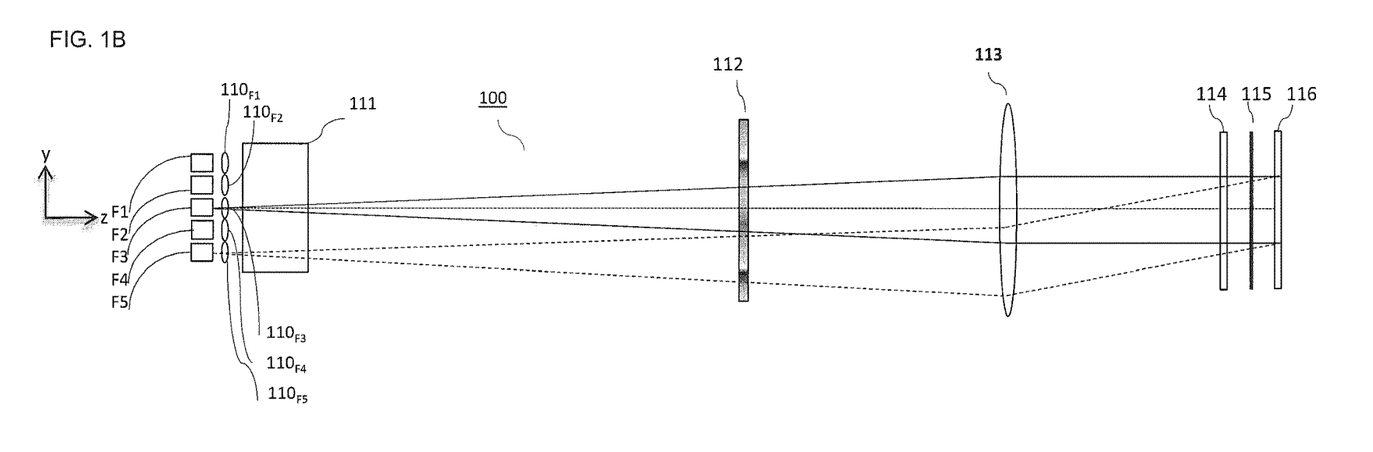
FIG. 1B is a schematic side view of the WSS structure according to FIG. 1A.

FIG. 1A is a schematic top plan view of a wavelength selective switch (WSS) structure 100 using a switching module having a liquid crystal on silicon (LCOS) phase array and a multi-pixel liquid crystal (LC) unit according to a first embodiment of the present subject matter; and FIG. 1B is a schematic side view of the WSS structure according to FIG. 1A. In FIG. 1A, an array of input and output (I/O) fibers (or I/O ports) F1-F5 are provided, which are arranged in a vertical plane, i.e., the plane orthogonal to the drawing paper. The vertical arrangement of the I/O fibers F1-F5 are notably illustrated in FIG. 1B. Initial light beams are emitted from an input fiber of the I/O fibers F1-F5 to a polarization dispersion element 111 through lenses $110_{F1}$-$110_{F5}$. The beams output from the polarization dispersion element 111 have substantially the same polarization. These beams of the same polarization enter into a wavelength dispersion element 112 such as a diffraction grating which disperses the wavelength components of each input beam in the same plane as that in which the beams were generated and expanded in the horizontal on the paper plane. A focusing element 113 receives the diffracted beams input from the wavelength dispersion element 112 and then focuses the separate components onto a switching module 117 which includes a polarization modulation element 114 such as a multi-pixel LC phase array, a polarizer 115, and a steering element 116 such as an LCOS phase array. The switching module 117 can selectively divert a certain wavelength component to continue to propagate while keeping another wavelength from doing so by controlling the voltage applied thereto and/or the polarization of light. The light beams traveling through the focusing element 113 pass through the multi-pixel LC phase array 114 and the polarizer 115 and is focused on the main surface of the LCOS phase array 116 that acts as a steering element or switching array. The selected light beams reflected from the surface of the LCOS phase array 116 travel back to the I/O fibers F1-F5 via the polarizer 115, the multi-pixel LC phase array 114 and focusing element 112 during the course. By combining the multi-pixel LC phase array 114 and polarizer 115 with the LCOS phase array 116, it is possible to remove or significantly reduce the crosstalk between the unintended ports (I/O fibers) and the dynamic crosstalk that may happen in the course of abrupt switching between the output ports. While the steering element 116 is illustrated herein as an LCOS phase array, it should be understood that the LCOS phase array can be replaced with an array of active-matrix liquid crystal (AMLC) pixels having a silicon backplane, polysilicon backplane or amorphous silicon backplane.

Figure 2A:
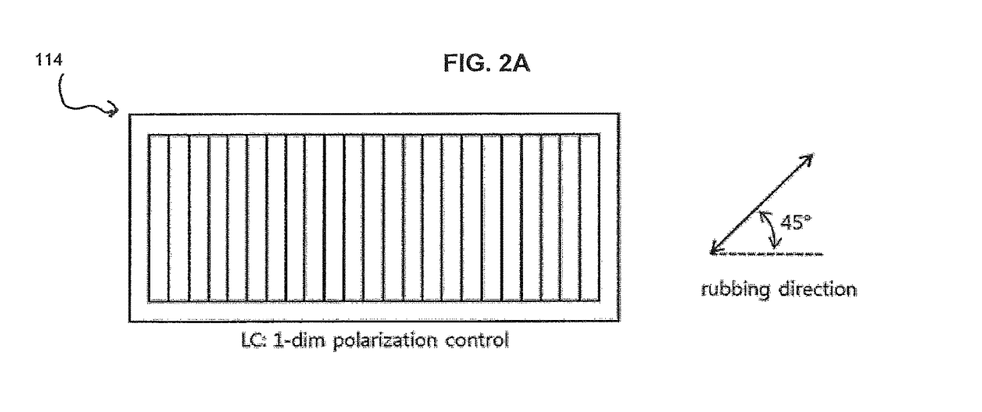
FIG. 2A is a schematic front view of a multi-pixel liquid crystal (LC) phase array in the multi-pixel LC unit of the switching module according to an embodiment of the present subject matter.
Figure 2B:
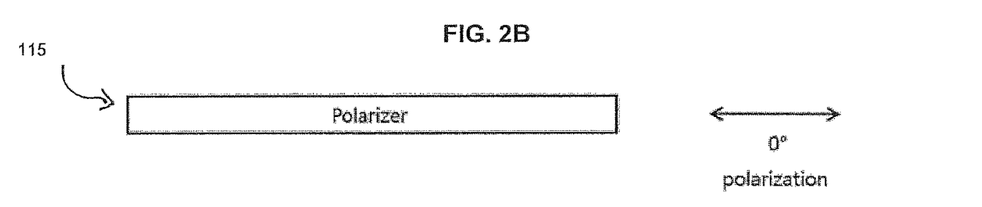
FIG. 2B is a schematic front view of a polarizer in the multi-pixel LC unit of the switching module according to an embodiment of the present subject matter.
Figure 2C:
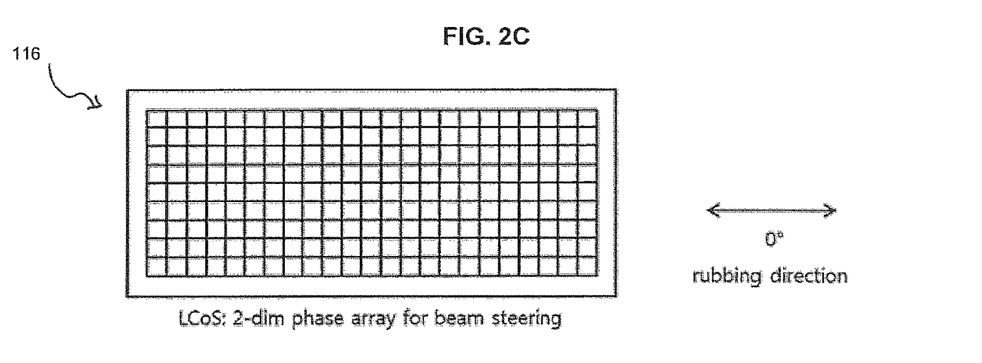
FIG. 2C is a schematic front view of a two-dimensional multi-pixel liquid crystal on silicon (LCOS) phase array according to an embodiment of the present subject matter.

FIG. 2A is a schematic front view of a multi-pixel liquid crystal (LC) phase array in the multi-pixel LC unit 114 of the switching module 117 according to an embodiment of the present subject matter; FIG. 2B is a schematic front view of a polarizer 115 of the switching module 117 according to an embodiment of the present subject matter; and FIG. 2C is a schematic front view of a two-dimensional multi-pixel liquid crystal on silicon (LCOS) phase array 116 according to an embodiment of the present subject matter. The multi-pixel LC phase array 114 as shown in FIG. 2A, the polarizer 115 as shown in FIG. 2B, and the two-dimensional multi-pixel LCOS phase array 116 as shown in FIG. 2C are assembled here to provide the switching module 117. Specifically, within the switching module 117, the LCOS phase array 116 as shown in FIG. 2C functions as a beam steering device for port switching while the switching module 117, which includes the LC phase array 114 as shown in FIG. 2A and the polarizer 115 as shown in FIG. 2B, acts as a beam attenuating/blocking device. In other words, the polarizer 115 is provided to attenuate the input light beams and also make a desired polarization (0 degree in this case) before LCOS phase array 116. The multiple domains as schematically illustrated in FIGS. 2A and 2C mean the pixels of the LC phase array 114 and LCOS phase array 116, respectively. In a horizontal direction (here, the wavelength direction), the pixels of the LC phase array 114 (FIG. 2A) are optically matched with those of the LCOS phase array 116 (FIG. 2C) in the ratio of 1:1 or in a predetermined ratio that is applied throughout the entire pixels. Also, the polarizer 115 (FIG. 2B) and the LCOS phase array 116 (FIG. 2C) have substantially the same polarization direction whereas the LC phase array 114 (FIG. 2A) has a 45 degree of polarization direction with respect to the polarization of the polarizer 115 and LCOS phase array 116, thereby controlling the amount of light beams passing therethrough within the range of 0 to 100%. The LC phase array 114 (FIG. 2A) can share the same focal plane with the LCOS phase array 116 (FIG. 2C) or lie on a different plane from the latter using the telescopic optics. While the steering element 116 is illustrated herein as an LCOS phase array, it should be understood that the LCOS phase array can be replaced with an array of active-matrix liquid crystal (AMLC) pixels having a silicon backplane, polysilicon backplane or amorphous silicon backplane.

When an LCOS is used as a switching element in a WSS, the attenuation control utilizing the functions of an LCOS phase array can cause unexpected crosstalk between the ports. In other words, the attenuated light beams from the steering port can leak into unintended ports (I/O fibers). In contrast to the previous attenuation scheme solely relying on the functions of the LCOS phase array, the attenuation utilizing the multi-pixel LC phase array and polarizer does not cause port crosstalk because it does not steer a light beam from one port to another, as in the case using the LCOS as an attenuator but pass/block the light beam.

Figure 3:
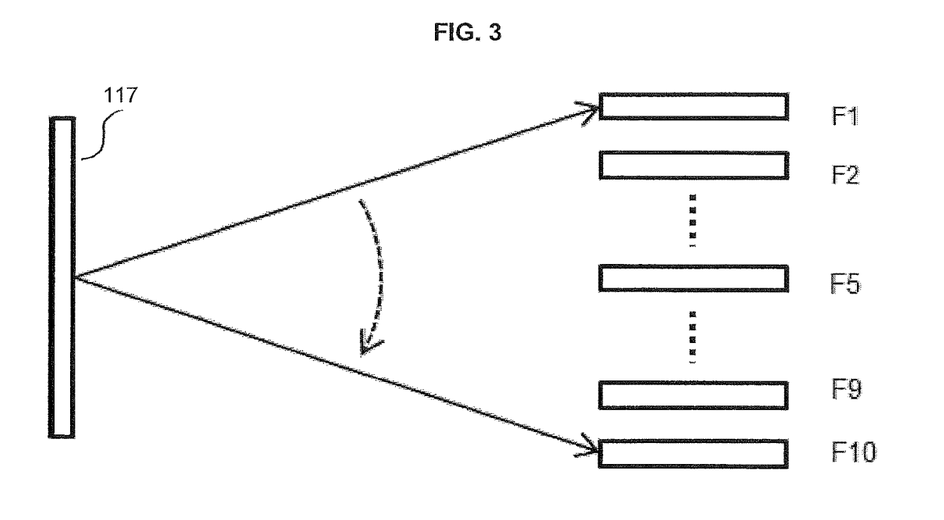
FIG. 3 schematically illustrates output port switching where the output port for a light beam is switched momentarily from a first port to a tenth port.

FIG. 3 schematically illustrates output port switching where the output port for a light beam is switched momentarily from a first port F1 to a tenth port F10. Another function of the combination of the multi-pixel LC phase array 114 and polarizer 115 in the switching module 117 is to remove or significantly reduce dynamic crosstalk between the ports. FIG. 3 shows the output port switching from Port 1 F1 to Port 10 F10. Here, the moment of the switching between the ports can cause the leakage of the beam into any of Port 2 F2 to Port 9 F9 during the transition of the beam, which is called dynamic crosstalk. The combination of the LC phase array 114 (FIG. 2A) and a polarizer 115 (FIG. 2B), at the moment of switching, blocks the beam from the channel at the front end of the LCOS phase array 116 using the properties of polarization, thereby removing or, at least, significantly reducing the dynamic crosstalk.

Figure 4A:
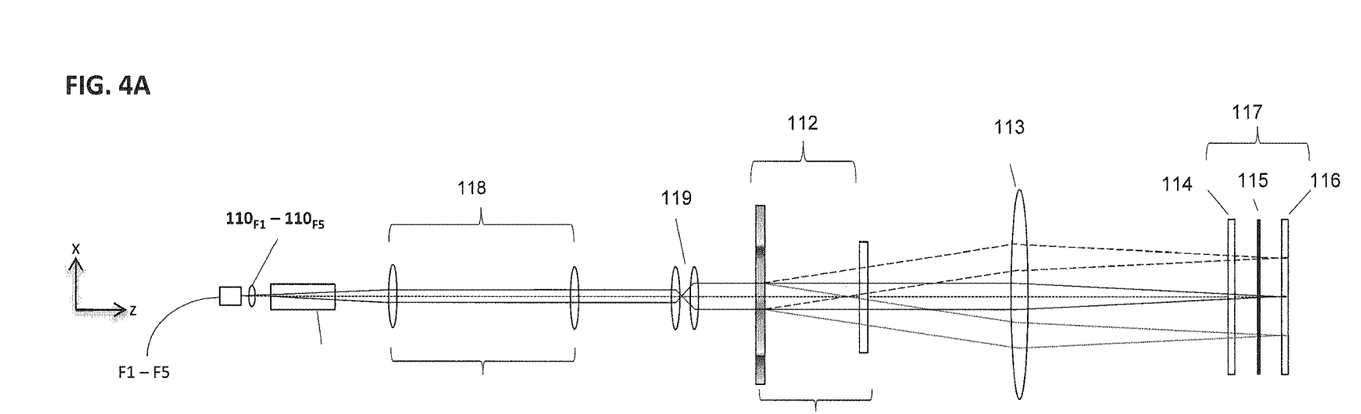
FIG. 4A schematic top plan view of a WSS structure using a switching module having an LCOS phase array and a multi-pixel LC unit according to a second embodiment of the present subject matter.
Figure 4B:
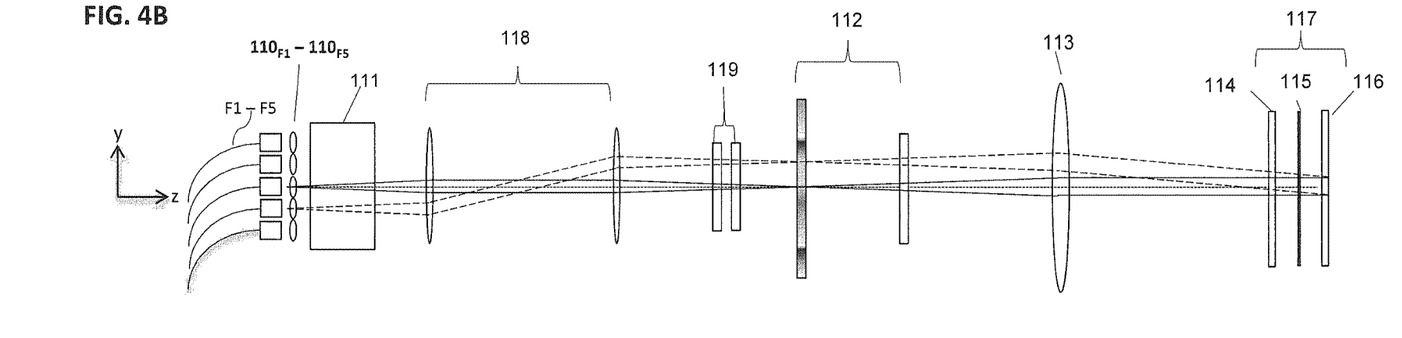
FIG. 4B is a schematic side view of the WSS structure according to FIG. 4A.

FIG. 4A is a schematic top plan view of a wavelength selective switch (WSS) structure 100 using a switching module 117 having a liquid crystal on silicon (LCOS) phase array 116 and a multi-pixel liquid crystal (LC) unit 114 according to a second embodiment of the present subject matter; and FIG. 4B is a schematic side view of the WSS structure 100 according to FIG. 4A. In FIG. 4A, an array of input and output (I/O) fibers (or I/O ports) F1-F5 are provided, which are arranged in a vertical plane, i.e., the plane orthogonal to the drawing paper. The vertical arrangement of the I/O fibers F1-F5 are notably illustrated in FIG. 4B. Initial light beams are emitted from an input fiber of the I/O fibers F1-F5 to a polarization dispersion element 111. The beams output from the polarization dispersion element 111 have substantially the same polarization. Then, the beams propagate via one or more relay elements 118, e.g., a spherical lens, cylindrical lens or other optical element, through an anamorphic expansion element 119 such as a prism pair or cylindrical lens pair whereby the beams are anamorphically expanded. These expanded beams enter into a wavelength dispersion element 112 such as a combination of a diffraction grating and a prism, which disperses the wavelength components of each input beam in the same plane as that in which the beams were generated and expanded in the horizontal on the paper plane. A focusing element 113, e.g., a spherical lens or mirror, receives the diffracted beams input from the dispersion element 112 and then focuses the separate components onto a switching module 117 which includes a polarization modulation element 114 such as a multi-pixel LC phase array, a polarizer 115, and a steering element 116 such as an LCOS phase array. This switching module 117 will be in more detail in the following drawings. The switching module 117 can selectively divert a certain wavelength component to continue to propagate while keeping another wavelength from doing so by controlling the voltage applied thereto and/or the polarization of light. The light beams traveling through the focusing element 113 pass through the multi-pixel LC phase array 114 and the polarizer 115 and is focused on the main surface of the LCOS phase array 116 that acts as a steering element or switching array. The selected light beams reflected from the surface of the LCOS phase array 116 travel back to the I/O fibers F1-F5 via the polarizer 115, the multi-pixel LC phase array 114 and the focusing element 113 during the course. By combining the multi-pixel LC phase array 114 and polarizer 115 with the LCOS phase array 116, it is possible to remove or significantly reduce the crosstalk between the unintended ports (I/O fibers) and the dynamic crosstalk that may happen in the course of abrupt switching between the output ports. While the steering element 116 is illustrated herein as an LCOS phase array, it should be understood that the LCOS phase array can be replaced with an array of active-matrix liquid crystal (AMLC) pixels having a silicon backplane, polysilicon backplane or amorphous silicon backplane.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A wavelength selective switch (WSS) apparatus comprising:
   a plurality of optical ports configured to emit input light beams to a switching module and receive output light beams from the switching module; and
   the switching module configured to receive the input light beams from the plurality of optical ports, and selectively divert a predetermined wavelength component of the input light beams to continue to propagate to the plurality of optical ports by reflecting the predetermined wavelength component therefrom while keeping other wavelength components of the input light beams from propagating by controlling the voltage applied to the switching module and/or a polarization of light, the switching module comprising:
   a polarization modulation element that includes an array of a plurality of liquid crystal (LC) pixels;
   a polarizer that is configured to attenuate the input light beams output from the polarization modulation element and allow only a desired polarization of the input light beams to enter a steering element; and
   the steering element that includes an array of a plurality of liquid crystal on silicon (LCOS) pixels,
   wherein, in a horizontal direction, the plurality of LC pixels in the polarization modulation element are optically matched with the LCOS pixels in the steering element in such a way that the ratio of the number of the plurality of LC pixels to the number of the LCOS pixels is a predetermined ratio,
   wherein a polarization of the polarization modulation element differs from a polarization of the polarizer while the polarization of the polarizer is the same as a polarization of the LCOS phase array,
   wherein the LC phase array in combination with the polarizer, during a period of switching, blocks the output light beams reflected from the LCOS phase array from propagating to the plurality of optical ports.

2. The WSS apparatus in accordance with claim 1, wherein the polarizer and the steering element have substantially the same polarization direction while the polarization modulation element has a 45 degree of polarization direction with respect to the polarization of the polarizer and steering element, thereby controlling amount of the light beams passing therethrough within the range of 0 to 100%.

3. The WSS apparatus in accordance with claim 1, wherein the polarization modulation element shares the same focal plane with the steering element.

4. The WSS apparatus in accordance with claim 1, wherein the polarization modulation element, the polarizer and the steering element are arranged in this order when seen from the plurality of optical ports so that the input light beams go through the polarization modulation element and the polarizer before being diverted at the steering element.

5. The WSS apparatus in accordance with claim 1, further comprising:
   a polarization dispersion element on a light path between the plurality of optical ports and a wavelength dispersion element, the polarization dispersion element being configured for making the input light beams output therefrom have substantially the same polarization;

the wavelength dispersion element on a light path between the polarization dispersion element and a focusing element, the wavelength dispersion element being configured for dispersing wavelength components of the input light beams in the same plane as a plane in which the input light beams are generated; and the focusing element on a light path between the wavelength dispersion element and the switching module, the focusing element being configured for focusing the dispersed wavelength components of the input light beams onto the switching module.

6. The WSS apparatus in accordance with claim 5, further comprising:
a relay element on a light path between the polarization dispersion element; and
an anamorphic magnification element on a light path between the relay element and the wavelength dispersion element, the anamorphic magnification element being configured to have the input light beams anamorphically expanded.

7. The WSS apparatus in accordance with claim 5, wherein the wavelength dispersion element comprises a diffraction grating and a prism.

8. The WSS apparatus in accordance with claim 6, wherein the relay element comprises at least one of a spherical lens and a cylindrical lens.

9. The WSS apparatus in accordance with claim 6, wherein the anamorphic magnification element comprises at least one of a pair of prisms and a pair of cylindrical lenses.

10. The WSS apparatus in accordance with claim 1, wherein the array of the plurality of LC pixels included in the polarization modulation element is a one-dimensional array of LC pixels.

11. The WSS apparatus in accordance with claim 1, wherein the array of the plurality of LCOS pixels included in the steering element is a two-dimensional active matrix array of LCOS pixels.

12. An optical communication system having a wavelength selective switch (WSS) apparatus, the WSS apparatus comprising:
a plurality of optical ports configured to emit input light beams to a switching module and receive output light beams from the switching module; and
the switching module configured to receive the input light beams from the plurality of optical ports and selectively divert a predetermined wavelength component of the input light beams to continue to propagate to the plurality of optical ports by reflecting the predetermined wavelength component therefrom while keeping other wavelength components of the input light beams from propagating by controlling the voltage applied to the switching module and/or a polarization of light, the switching module comprising:
a polarization modulation element that includes a one-dimensional array of a plurality of liquid crystal (LC) pixels;
a polarizer that is configured to attenuate the input light beams output from the polarization modulation element and allow only a desired polarization of the input light beams to enter a steering element; and
the steering element that includes a two-dimensional array of a plurality of active matrix liquid crystal (AMLC) pixels,
wherein, in a horizontal direction, the plurality of LC pixels in the polarization modulation element are optically matched with the AMLC pixels in the steering element in such a way that the ratio of the number of the plurality of LC pixels to the number of the LCOS pixels is a predetermined ratio,
wherein the AMLC pixels include at least one selected from the group consisting of a silicon backplane, a polysilicon backplane and an amorphous silicon backplane,
wherein a polarization of the polarization modulation element differs from a polarization of the polarizer while the polarization of the polarizer is the same as a polarization of the LCOS phase array,
wherein the LC phase array in combination with the polarizer, during a period of switching, blocks the output light beams reflected from the LCOS phase array from propagating to the plurality of optical ports.

13. The optical communication system in accordance with claim 12, wherein the polarizer and the steering element have substantially the same polarization direction while the polarization modulation element has a 45 degree of polarization direction with respect to the polarization of the polarizer and steering element, thereby controlling amount of the light beams passing therethrough within the range of 0 to 100%.

14. The optical communication system in accordance with claim 12, wherein the polarization modulation element shares the same focal plane with the steering element.

* * * * *